United States Patent
Veiga et al.

(10) Patent No.: US 6,239,046 B1
(45) Date of Patent: May 29, 2001

(54) POLYSILOXANE COATED FABRICS FOR USE IN AIR BAGS

(75) Inventors: Manuel J. Veiga, Tewksbury; Richard J. Satin, Swampscott, both of MA (US)

(73) Assignee: Bradford Industries, Inc., Lowell, MA (US)

(*) Notice: Subject to any disclaimer, the term of this patent is extended or adjusted under 35 U.S.C. 154(b) by 0 days.

(21) Appl. No.: 09/327,243

(22) Filed: Jun. 7, 1999

(51) Int. Cl.[7] .................... B60R 21/20; B32B 27/04
(52) U.S. Cl. .................. 442/76; 280/728.1; 280/729; 280/730.1; 280/730.2; 280/732; 428/12; 428/35.7; 428/36.1; 428/36.2; 428/36.6; 428/36.7; 428/57; 428/58; 428/192; 442/67; 442/71; 442/149; 442/157; 442/164
(58) Field of Search .................. 428/12, 35.7, 36.1, 428/36.2, 36.6, 36.7, 57, 58, 192; 442/67, 71, 76, 149, 157, 164; 280/728.1, 729, 730.1, 730.2, 732

(56) References Cited

U.S. PATENT DOCUMENTS

| | | |
|---|---|---|
| 4,284,682 | 8/1981 | Tschirch et al. ............... 428/263 |
| 5,110,666 | 5/1992 | Menzel et al. ................. 428/196 |
| 5,178,938 | 1/1993 | Magistro et al. .............. 428/252 |
| 5,226,671 | 7/1993 | Hill ................................. 280/743 |
| 5,240,765 | 8/1993 | Takahashi et al. ............. 428/265 |
| 5,254,621 | 10/1993 | Inoue et al. .................... 524/837 |
| 5,258,211 | 11/1993 | Momii et al. .................. 428/35.2 |
| 5,298,317 | 3/1994 | Takahashi et al. ............. 428/266 |
| 5,399,402 | 3/1995 | Inoue et al. .................... 428/35.7 |
| 5,514,431 | 5/1996 | Shimomura .................... 428/35.3 |
| 5,630,620 | 5/1997 | Hirai et al. . |
| 5,632,057 | 5/1997 | Lyden ............................ 12/146 B |
| 5,647,079 | 7/1997 | Hakamiun et al. ............. 5/713 |
| 5,651,395 | 7/1997 | Graham et al. . |
| 5,704,402 | 1/1998 | Bowen et al. . |
| 5,707,711 | 1/1998 | Kitamura . |
| 5,721,046 | 2/1998 | Shrewsburg et al. .......... 428/304.4 |
| 5,863,644 | 1/1999 | Bonkgk et al. . |
| 5,881,776 | 3/1999 | Beasley, Jr. . |
| 5,921,287 | 7/1999 | Bowen et al. . |
| 6,037,279 | 3/2000 | Brookman et al. . |

Primary Examiner—Blaine Copenheaver
Assistant Examiner—Arti R. Singh
(74) Attorney, Agent, or Firm—Hoffman & Baron, LLP

(57) ABSTRACT

The invention is directed to coating a knit, woven, or non-woven textile substrate with adhesive polyurethane layer and then with an elastomeric polysiloxane layer and to then form an air curtain or air bag therefrom with superior air-holding and superior heat resistance.

27 Claims, 1 Drawing Sheet

POLYSILOXANE COATED FABRICS FOR USE IN AIR BAGS

FIELD OF THE INVENTION

This invention relates to a coated textile fabric for use in an air-holding vehicle occupant restraint system and, more particularly, to a fabric having a plurality of polymeric layers coated thereon for use in such a vehicle occupant restraint system and the method of coating said textile fabric.

BACKGROUND OF THE INVENTION

The current restraint systems for vehicles include driver side air bags which are housed in the steering wheel in a collapsed, folded condition adapted to be deployed instantaneously in an inflated condition by injection of a gas upon the occurrence of a collision. The advent of such driver-side air bags has resulted in a significant decrease in automotive fatalities.

Air bag restraint systems have also been located in the dashboard in order to provide a comparable measure of protection to the passenger seated adjacent the driver.

The automotive industry has recently introduced air bags which are housed in the backs of the front seats or the rear seats to protect the cabin occupants in the event of a collision occurring on either side of the vehicle.

A still further safety feature which is being marketed for passenger vehicles, especially sport utility vehicles (SUV), are air-holding curtains designed to provide a cushioning effect in the event of roll-over accidents. These curtains are housed in the roof of the vehicle beneath the headliner and deploy along the interior sidewalls in the event of a rollover.

One means of improving the efficacy of air-holding vehicle restraint systems has addressed the coatings to be applied to the textile substrate to improve air retention.

In the prior art, coated air bags were made by coating a nylon or polyester substrate with chloroprene or silicone rubber. They were not, however, susceptible to heat sealing. In order to ameliorate the problems inherent in chloroprene and silicone rubber coatings, it has been disclosed in the art to coat the fabric substrate with certain aqueous silicone emulsion compositions which yields a tack-free surface and high mechanical strength to prevent cracking upon inflation of the airbag. Such an air bag coating composition is disclosed in Inoue et al., U.S. Pat. No. 5,254,621.

Despite the advances in air bag coating technology, the problems of controlling air permeability, air pressure, and volume still remain when stitching is involved.

SUMMARY OF THE INVENTION

It has now been found that if a knit, woven or non-woven textile fabric substrate is first coated with a polyurethane layer and, thereafter, the polyurethane layer is coated with a layer of an elastomeric polysiloxane, the air bag formed therefrom not only has superior air holding permeability and volume, but also possesses superior heat resistance which is of special significance during inflation due to the very high temperatures generated when hot inflation gases are employed. Furthermore, since silicone is inert, it will not block or stick to itself even during extended periods of non-use, while housed in the vehicle, but will nonetheless deploy in an efficient and rapid manner when the need arises to provide the required protection during a crash.

BRIEF DESCRIPTION OF THE DRAWINGS

In describing the figures, similar parts in the various embodiments will be referred to by the same numerals.

DETAILED DESCRIPTION OF THE INVENTION

It has been found that when a surface of a textile substrate having opposed surfaces is initially coated with a polyurethane layer and, thereafter, with a layer of a polysiloxane, the coated substrate when converted into an air-holding restraint system by sewing, or by sewing and heat sealing, or by sewing and room temperature vulcanization of two (2) such coated substrates together, there results a restraint system having improved air retention. The polysiloxane coating permits the air bag to better withstand the extremely high temperatures encountered during inflation and to avoid the problem of coatings which self-block or stick to themselves.

Either a polyamide, a polyester, or other synthetic fibers can be employed as the textile fabric substrate, and it can be in the form of either a knit, a woven or a non-woven fabric. A woven nylon is the preferred fabric substrate. Any type of denier size, shape and weaving configuration can be employed to advantage. The shape or configuration to be employed in the air holding restraint system will depend upon its ultimate location in the vehicle. For example, driver or passenger air bags will generally be elliptical, spherical or circular, while air curtains will generally be rectangular or oval in configuration.

The coating of the fabric substrate takes place on a coating line that has multiple coating stations with driers in sequence. Initially, prior to applying the first polyurethane coating layer, the fabric substrate is heat-set and stabilized by passing through an oven at about 250° F. to 400° F. Thereafter, it is coated in accordance with the present invention.

Figure 1:
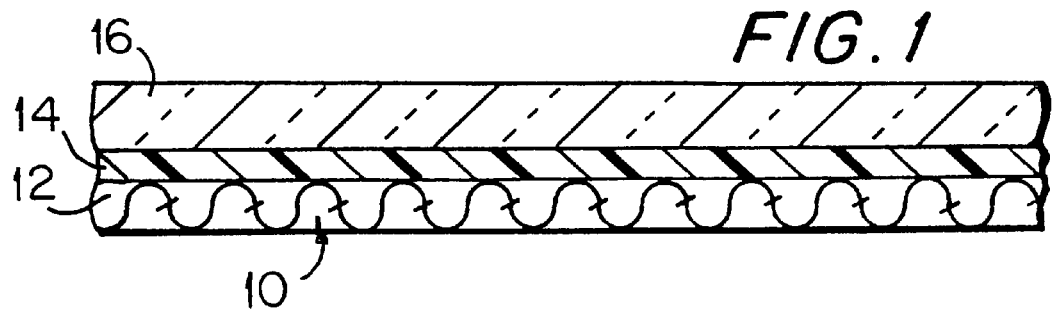
FIG. 1 is a cross-sectional view of a textile substrate coated on one surface with a silicone and a polyurethane layer in accordance with the present invention.

In one embodiment of the present invention, as can be seen by reference to FIG. 1, a fabric substrate 10 is first coated on its upper or top surface 12 with a polyurethane layer 14, which is referred to as a prime coat or adhesive coat, which serves to adhesively bond the filaments of the textile substrate so they do not comb or unravel. The polyurethane used in the prime coat or first layer 14 can be selected from among aliphatic and aromatic polyether and polyester polyurethanes, preferably those having a solids content of from about 30% to about 60%, by weight. These types of polyurethanes provide good adhesion to nylon and polyester and have satisfactory hydrolysis, i.e., resistance to breakdown under ambient storage conditions, to insure that the air bag is ready for use when deployed.

The polyurethane coating weight applied is about 0.3 ounces/square yard to about 1.5 ounces/square yard with about 0.5 ounces/square yard preferred.

Preferably, the prime coat layer 14 completely covers the entire surface 12 of the fabric 10, or it can be a partial coating designed to coincide with a particular area of the fabric. Also particular patterns, such as stripes, wavy lines, etc., with different coating weights can be employed to obtain the level of air permeability desired.

The prime coat layer is then dried in an oven at an elevated temperature of from about 225° F. to about 425° for about 1.5 minutes to about 3.0 minutes while advancing the fabric at about 1,000 yds/hr. to about 3,000 yds./hr., with 1,200 yds/hr. preferred.

At a second coating station, an elastomeric polysiloxane layer 16 is then coated onto the surface of the polyurethane layer 14 in overlying relationship thereto. The coating weight of the elastomeric polysiloxane layer is about 0.5 ounces/sq. yd. to about 5.0 ounces/sq. yard, with about 1.2 ounces/sq. yard being preferred. It is then dried in an oven at an elevated temperature of about 300° F. to 450° F.

Since the silicone layer 16 is inert, it yields a non-blocking product which does not stick to itself either during extended storage in the vehicle and will deploy instantaneously when needed in the event of an accident. Further, silicone is extremely resistant to the elevated temperature encountered during inflation.

The laminated or composite structure depicted in FIG. 1 typically forms a panel of an air bag or air curtain after die cutting into the desired configuration by the air bag manufacturer. A complementary composite structure, similar in all respects to the structure of FIG. 1, forms the opposite panel of the air bag or air curtain. In accordance with the present invention, a pair of such coated panels are joined together about their peripheries by sewing alone, or by sewing and heat sealing, or by sewing and room temperature vulcanization. When heat sealing is employed, radio frequency (RF) sealing, hot air sealing or ultrasonic sealing at about 10 to about 80 megahertz and at about 250° F. to about 450° F. are the preferred sealing methods, with radio frequency sealing being especially preferred.

Figure 2:
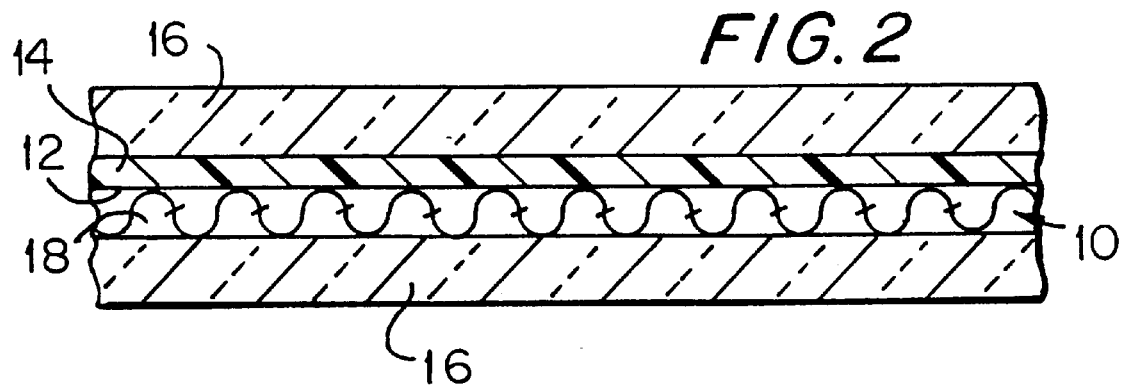
FIG. 2 is a cross-sectional view of a textile substrate coated on one surface in accordance with the embodiment of FIG. 1 and with a polysiloxane coating on the reverse surface.

In another embodiment of the present invention, there is depicted in FIG. 2 the same composite structure as shown in FIG. 1 on the upper surface 12 of substrate 10, while the bottom or inner surface 18 is coated with a silicone layer 16, which is similar in its chemical and physical properties to the silicone layer 16 shown in FIG. 1. This silicone layer provides added heat resistance to the interior of the airbag to protect it against the hot gases generated during inflation.

Figure 3:
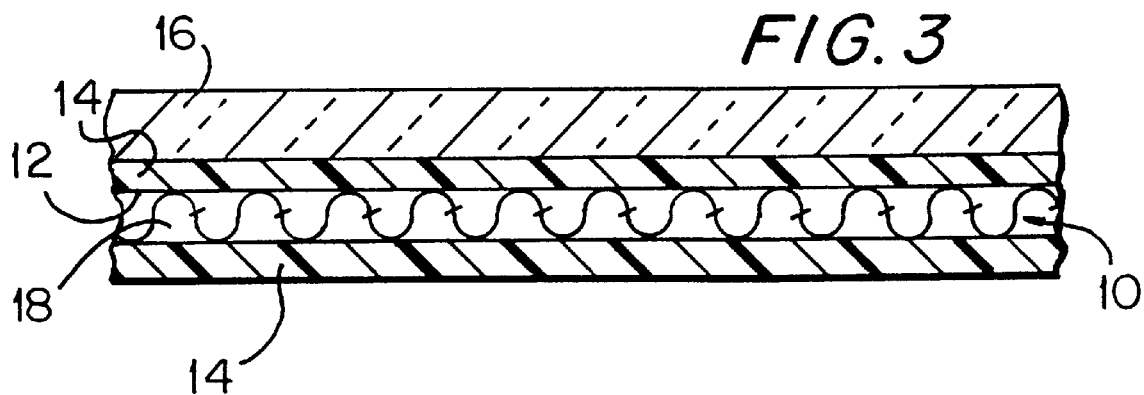
FIG. 3 is a cross-sectional view of a textile substrate coated on one surface in accordance with the embodiment of FIG. 1 and with a polyurethane coating on the reverse surface.

In an alternative embodiment of the present invention, there is shown in FIG. 3 the same laminated structure as in FIG. 1 on the upper surface 12 of substrate 10, while the inner surface 18 is coated with a polyurethane layer 14, which is similar in its composition and chemical and physical properties to the prime coat polyurethane layer 14 of FIG. 1. Having a polyurethane coating layer, or if desired plural polyurethane coating layers, on the inner surface of the substrate, serves to enhance the air holding permeability of the air bag and affords better control of the air volume and air pressure.

What is claimed is:

1. An air bag comprising:
   a.) a textile substrate having opposed surfaces;
   b.) a first coating layer of an adhesive polyurethane on one surface of said textile substrate; and
   c.) a second coating layer of an elastomeric polysiloxane on said first coating layer.

2. The air bag of claim 1 wherein said textile substrate is a fabric constructed from synthetic fibers.

3. The air bag of claim 2 wherein the synthetic fibers are selected from the group consisting of polyamides and polyesters.

4. The air bag of claim 1 wherein said textile substrate is a knitted, woven, or non-woven fabric.

5. The air bag of claim 1 wherein the textile substrate is a woven nylon.

6. The air bag of claim 1 wherein the first coating layer is selected from the group consisting of aromatic or aliphatic polyester or polyether polyurethanes.

7. The air bag of claim 1 wherein the first coating layer has a coating weight of from about 0.3 ounces/square yard to about 1.5 ounces/sq. yd.

8. The air bag of claim 7 wherein the coating weight is about 0.5 ounces/sq. yd.

9. The air bag of claim 1 wherein the second coating layer has a coating weight of from about 0.5 ounces/sq. yd to about 5.0 ounces/per sq. yd.

10. The air bag of claim 9 wherein the second coating layer has a coating weight of about 1.2 ounces per sq. yd.

11. The air bag of claim 1 wherein the other surface of said textile substrate is coated with an adhesive polyurethane.

12. The air bag of claim 1 wherein the other surface of said textile substrate is coated with a polysiloxane.

13. An air bag comprising:
   a pair of coated textile substrates which are joined together;
   the outer surface of each substrate having an adhesive polyurethane layer coated thereto and an overlying elastomeric polysiloxane layer.

14. An air bag of claim 13 wherein the coated textile substrates are joined by heat sealing or by heat sealing and sewing.

15. The air bag of claim 14 wherein the coated textile substrates are heat sealed by radio frequency sealing, hot air sealing or ultrasonic sealing.

16. The air bag of claim 15 wherein the coated textile substrates are sealed by radio frequency sealing at from about 10 to about 80 megahertz.

17. The air bag of claim 13 wherein the coated textile substrates are joined about their peripheries.

18. The air bag of claim 13 wherein the air bag is an air-holding curtain.

19. The air bag of claim 13 wherein the coated textile substrates are selected from the group consisting of polyesters, polyamides or other synthetic fibers.

20. The air bag of claim 13 wherein the coated textile substrates are woven nylon.

21. The air bag of claim 13 wherein the adhesive polyurethane coating layer is selected from the group consisting of aliphatic or aromatic polyester or polyether polyurethanes.

22. The air bag of claim 13 wherein the weight of the adhesive coating layer is from about 0.3 ounces per sq. yd to about 1.5 ounces per sq. yd.

23. The air bag of claim 22 wherein the weight of the adhesive coating layer is about 0.5 ounces per sq. yd.

24. The air bag of claim 13 wherein the weight of the polysiloxane coating layer is from about 0.5 ounces per sq. yd. to about 5.0 ounces per sq. yd.

25. The air bag of claim 24 wherein the weight of the polysiloxane layer is about 1.2 ounces per sq. yd.

26. The air bag of claim 13 wherein the inner surface of each of said textile substrates is coated with an adhesive polyurethane.

27. The air bag of claim 13 wherein the inner surface of each of said textile substrates is coated with an elastomeric polysiloxane.

* * * * *